United States Patent [19]
Stanley

[11] 3,847,329
[45] Nov. 12, 1974

[54] ROCKET ESCAPE APPARATUS
[75] Inventor: Robert M. Stanley, Denver, Colo.
[73] Assignee: Stanley Aviation Corporation, Aurora, Colo.
[22] Filed: Aug. 31, 1972
[21] Appl. No.: 285,254

[52] U.S. Cl. .................................. 244/122 AD
[51] Int. Cl. ............................... B64d 25/10
[58] Field of Search .. 244/122 A, 122 AB, 122 AD, 244/122 AE; 89/1 B, 1.813, 1.818

[56] References Cited
UNITED STATES PATENTS
| | | | |
|---|---|---|---|
| 2,951,420 | 9/1960 | Bohlin | 89/1 B |
| 3,055,619 | 9/1962 | MacDonald et al. | 244/122 AB |
| 3,433,440 | 3/1969 | Stanley | 244/122 AD |
| 3,442,473 | 5/1969 | Rivedal et al. | 244/122 AB |

Primary Examiner—Trygve M. Blix
Assistant Examiner—Charles E. Frankfort
Attorney, Agent, or Firm—Strauch, Nolan, Neale, Nies & Kurz

[57] ABSTRACT

An apparatus for pulling a man or other load from a vehicle and having a rocket and a towline providing a motion-transmitting connection between the rocket and the load so that flight of the rocket pulls the load from the space. Force direction conversion means carried by the rocket provides for rocket ignition in obedience to towline pull under the condition where the rocket is weathercocked by the windblown posture of the towline. One or more parts on the rocket are deployable during rocket flight to act as a tail boom.

24 Claims, 31 Drawing Figures

PATENTED NOV 12 1974 3,847,329
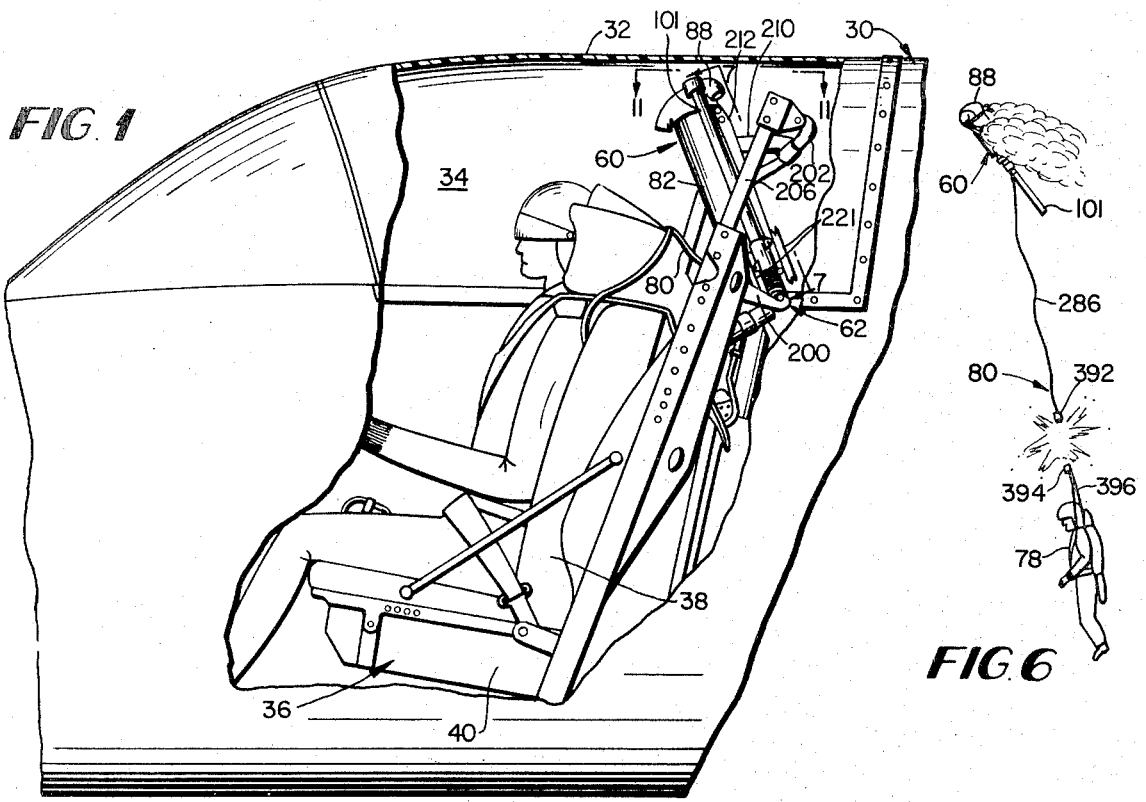
FIG. 1
FIG. 6
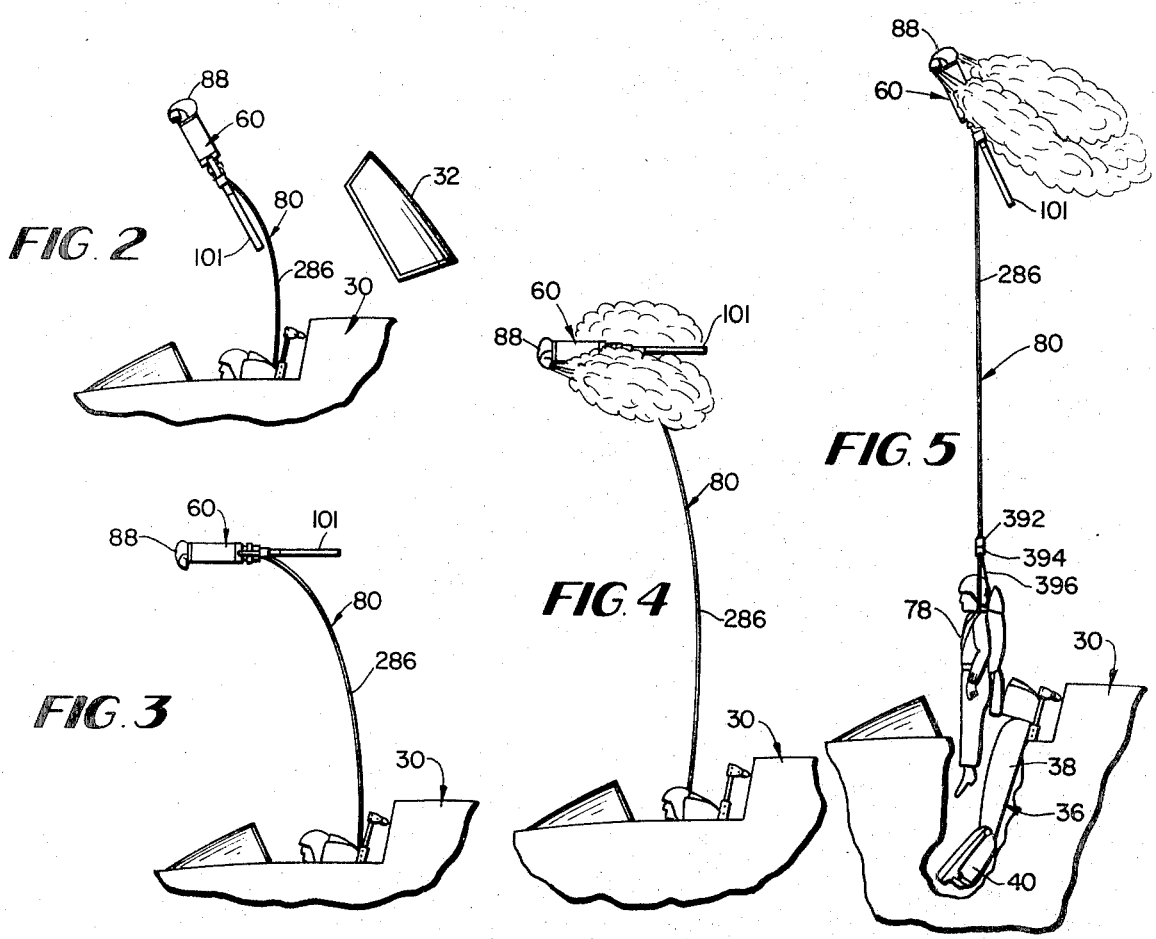
FIG. 2
FIG. 3
FIG. 4
FIG. 5

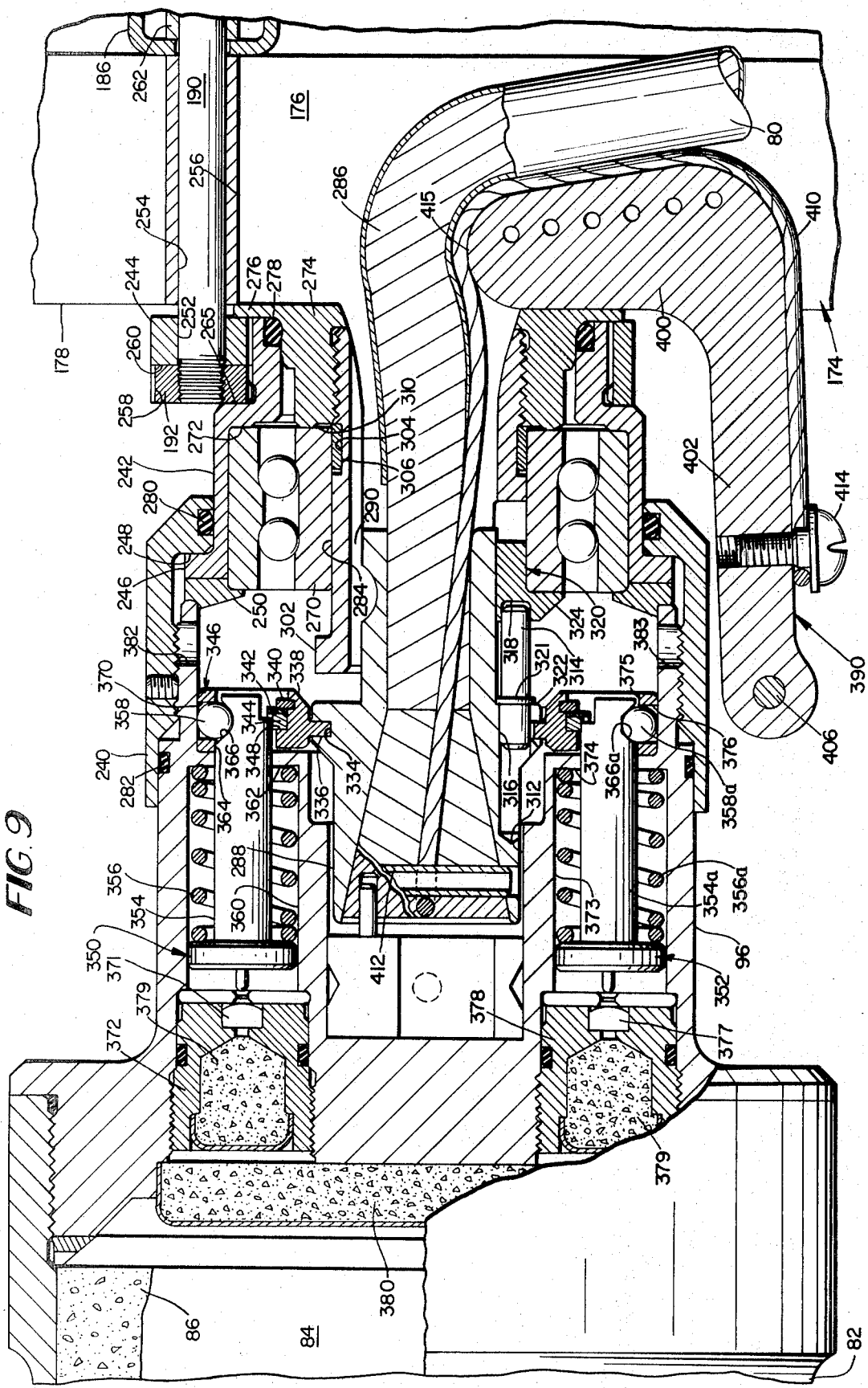

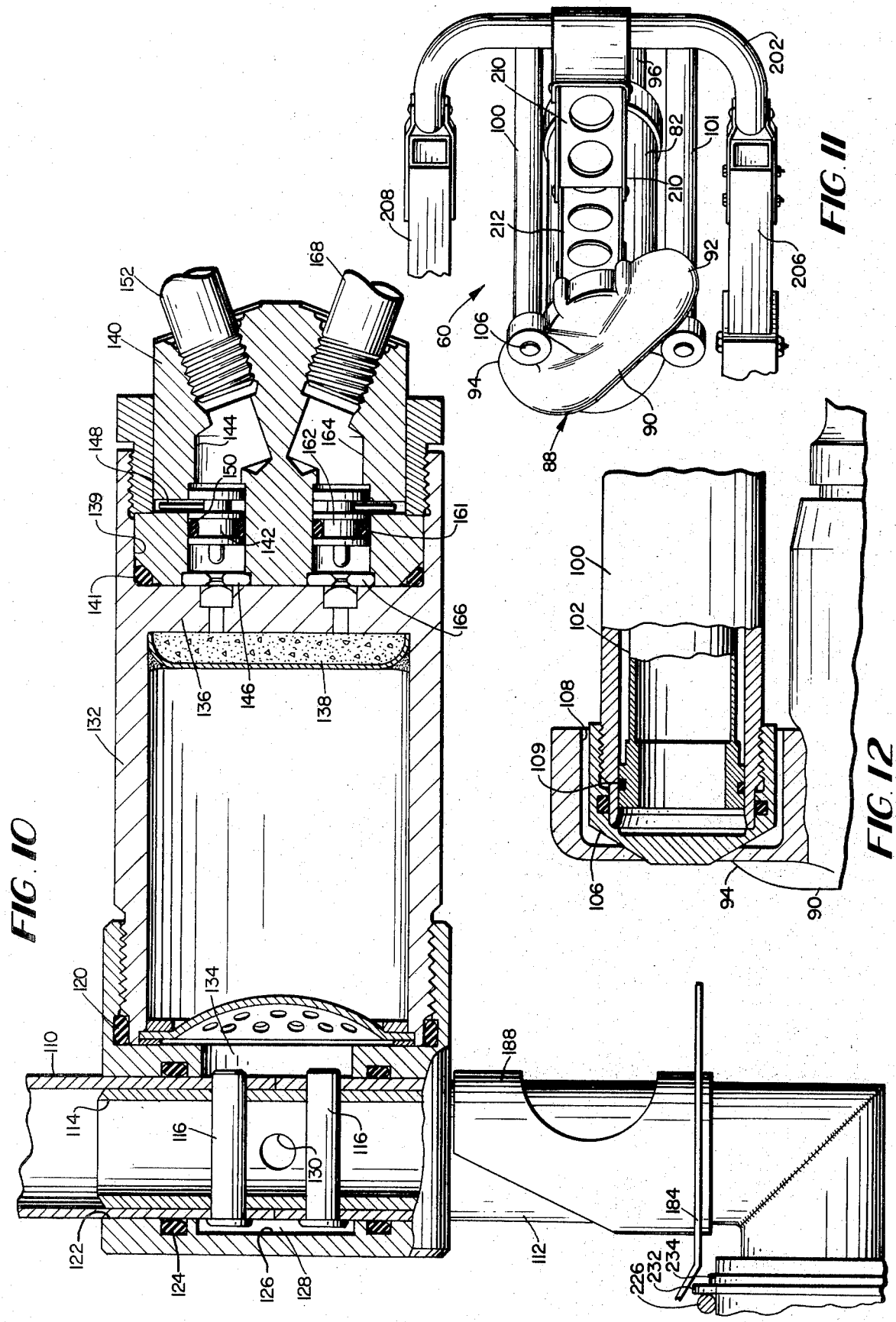

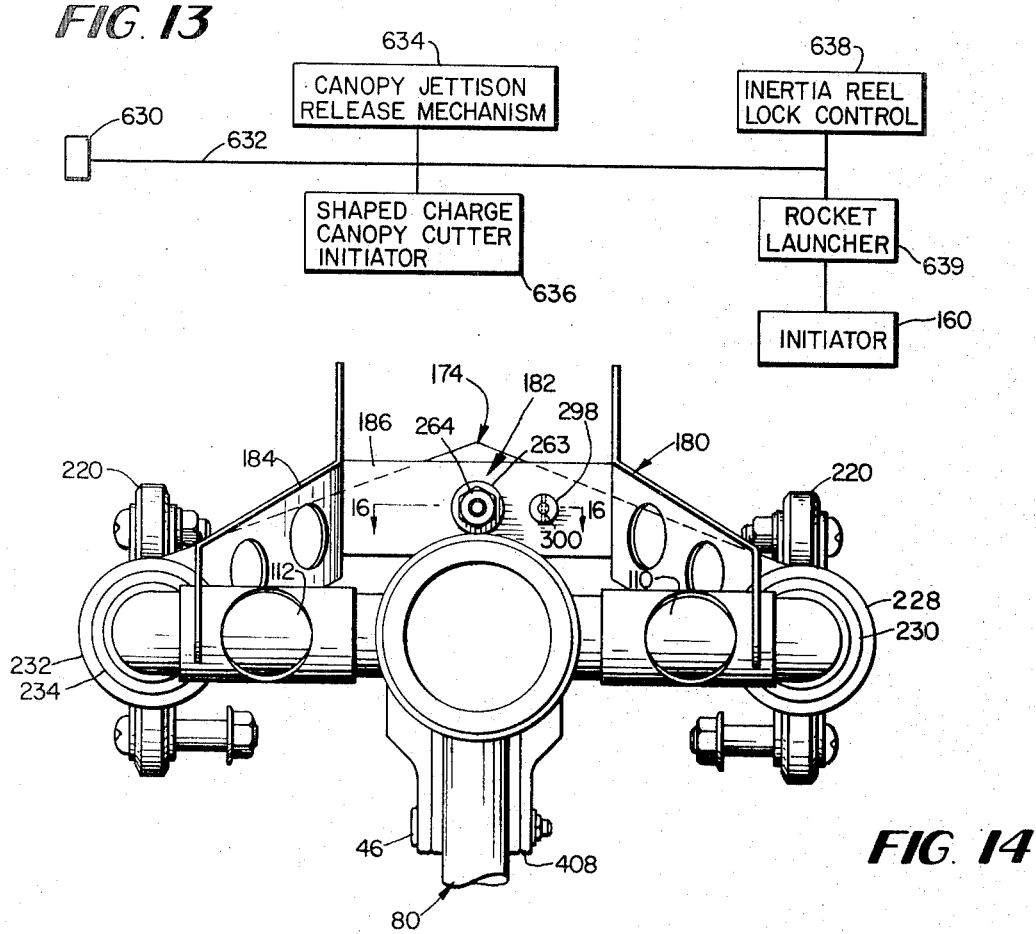
FIG. 13
FIG. 14
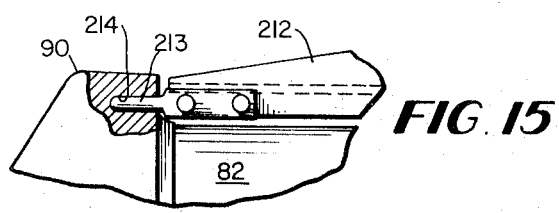
FIG. 15
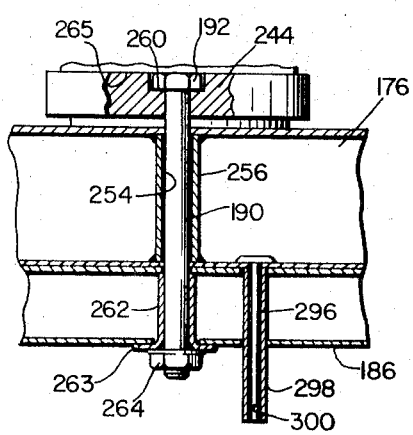
FIG. 16

ROCKET ESCAPE APPARATUS

FIELD OF INVENTION

This invention relates to a rocket apparatus for applying a pulling force to an object and is especially concerned with a rocket escape apparatus for removing an occupant from a vehicle.

BACKGROUND

Prior to this invention extraction or tractor type rockets have advantageously been employed to pull a crewman from an aircraft. This type of rocket escape system is described in U.S. Pat. No. 3,355,127 issued to R. M. Stanley et al on Nov. 28, 1967 for Occupant Escape Apparatus For An Aircraft Or The Like, U.S. Pat. No. 3,424,409 issued to R. M. Stanley on Jan. 28, 1969 for Occupant Escape Apparatus For An Aircraft Or The Like, and U.S. Pat. No. 3,433,440 issued to R. M. Stanley on May 18, 1969 for Erector and Positioning Devices For Air Crew Escape System Rocket.

In the rocket escape systems described in the foregoing patents, the extraction rocket is connected to the man by a flexible towline or pendant. The extraction rocket is launched in an unignited condition from the aircraft, and when the towline is pulled taut by the unignited rocket flight, the rocket propellant is ignited, thus causing the rocket to extract the man from the aircraft or other vehicle.

The extraction rocket escape system of the foregoing type has served successfully up to airspeeds of approximately 385 knots. Above this speed, however, the extraction rocket has a tendency to blow backwards during its flight, thereby creating the possibility of personnel injury and/or submarginal tail clearance. In particularly, it was found that the towline, by assuming a catenary shape at relatively high air speeds, exerted a pitching moment on the rocket, causing it to tip down to the horizontal. Examination revealed, however, that ignition of the rocket propellant failed to occur until the rocket, in obedience to towline pull, had flipped upwardly to a pitch angle of at least approximately 90°. As a result, the rocket assumed a relatively poor attitude when finally ignited.

SUMMARY AND OBJECTS OF INVENTION

One of the major objects of this invention is to provide a novel extraction rocket escape apparatus that improves the rocket trajectory in the presence of high speed wind blasts.

More particularly, an important object of this invention is to provide a novel extraction rocket escape apparatus that is capable of safely removing a crewman or a load at higher airspeeds than those that could be tolerated by prior extraction rocket escape systems.

According to this invention, the rocket is provided with a triggering mechanism that will ignite the rocket propellant while the rocket is weathercocked or in an attitude of low pitch angle. The triggering mechanism is also capable of igniting the rocket propellant in response to an axial pull when the longitudinal axis of the rocket and the towline are substantially aligned.

In the rocket apparatus of this invention, launching tubes, that are attached to the rocket, are deployed rearwardly upon launching the rocket to act as a tail boom or a tail fin. In this manner, the center of gravity and the center of pressure of the rocket are moved rearwardly and closer to the point where the towline triggering force is applied to the rocket, thereby increasing the pitching moment of inertia of the rocket during its flight.

By increasing the rotational moment of inertia in rocket pitch, the rate at which the rocket will flip up is slowed. Thus, at relatively high speeds, the rocket immediately weathercocks into the wind stream and by virtue of the triggering mechanism mentioned above, the rocket propellant will be ignited while the rocket is still weathercocked. Upon ignition, the weathercocked rocket will drive forward into the wind stream and due to its rearwardly displaced centers of gravity and pressure, will gradually pitch upwardly until the towline load balances the aerodynamic drag on the rocket. In this manner, crewmen may safely be extracted from aircrafts or other vehicles at speeds ranging up to approximately 600 knots, thus providing an increased airspeed range of operation as compared with the working airspeed range for such prior rocket extraction systems as the one described in U.S. Pat. No. 3,355,127.

With the foregoing in mind, another important object of this invention is to provide a novel extraction rocket apparatus in which ignition of the rocket fuel is independent of any weathercocking of the rocket or wind-blown posture of the towline.

Another important object of this invention is to provide a novel rocket apparatus in which the center of gravity is moved rearwardly during rocket flight.

Still another object of this invention is to provide a novel rocket apparatus in which the center of pressure is moved rearwardly during rocket flight.

Still another important object of this invention is to provide a novel apparatus that increases the pitching moment of inertia of the rocket during its flight.

A more specific object of this invention is to provide a rocket apparatus in which launching tubes, that are attached to the rocket, are repositioned to act as a tail boom to increase the pitch moment of inertia of the rocket.

Further objects of this invention will become apparent as the description proceeds in connection with the appended claims and the below-described drawings.

DESCRIPTION OF DRAWINGS

FIG. 1 is a fragmentary side elevation of an aircraft containing a preferred embodiment of this invention and having the fuselage partially broken away to illustrate interior details;

FIGS. 2, 3, 4, 5, and 6 are similar to FIG. 1 and illustrate a sequence of rocket positions during the rocket flight;

FIG. 9 is a fragmentary section taken substantially along lines 9—9 of FIG. 7;

FIG. 10 is a fragmentary section taken substantially along 10—10 of FIG. 8;

FIG. 11 is a section taken along lines 11—11 of FIG. 1;

FIG. 12 is a fragmentary, enlarged, sectioned detail of the launcher tube assembly at its region of engagement with the rocket nozzle housing;

FIG. 13 is a schematic view of the control system for operating the rocket escape apparatus shown in FIG. 1;

FIG. 14 is a bottom plan view of the lower end of the rocket and rocket launching assembly shown in FIGS. 1 and 7;

FIG. 15 is a section taken substantially along lines 15—15 of FIG. 7;

FIG. 16 is a section taken substantially along lines 16—16 of FIG. 14;

DETAILED DESCRIPTION

Figure 8:
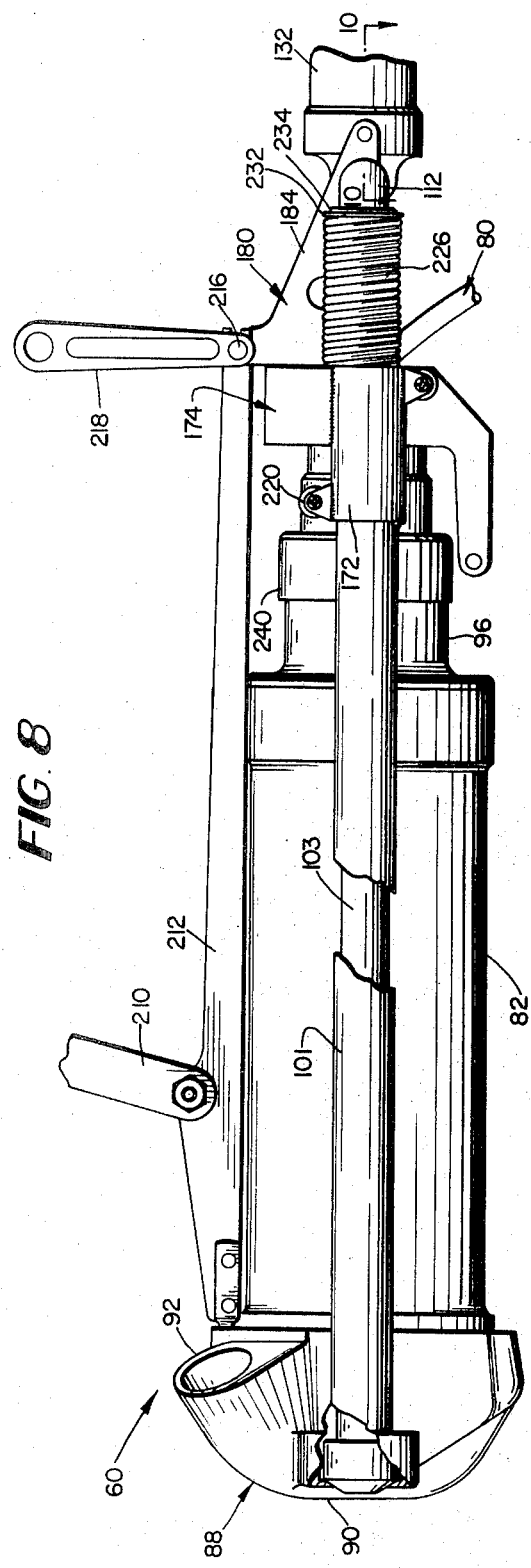
FIG. 8 is another side elevation of the rocket and launcher assembly as viewed from lines 8—8 of FIG. 7.

Although the present invention is described herein to be incorporated into an aircraft, it will be appreciated that it is applicable to numerous other forms of vehicles, such as, for example, space vehicles, aero space vehicles, aero jeeps, and the like. In addition, this invention may be applied to remove any form of load or object from any space or to apply a pull to any form or load.

Referring now to the drawings and more particularly to FIG. 1, the reference numeral 30 generally designates an aircraft having a conventional, jettisonably canopy 32 for enclosing a cockpit 34. Mounted in cockpit 34 is a seat 36 for the pilot or other occupant. Seat 36 comprises a seat back 38 extending upwardly from a seat pan 40.

Canopy 32 is conventionally mounted for movement between the illustrated hatch-closed position and a hatch-opened position. Aircraft 30 may be of any suitable construction. Seat 36 may be conventional and is advantageously the same as the second embodiment described in U.S. Pat. No. 3,355,127.

The rocket escape system of this invention comprises a tractor rocket 60 and a rocket launching assembly 62. As will be described in detail later on, the aft or rearward end of rocket 60 is secured to the pilot's torso harness 78 by a flexible, motion-transmitting pendant or towline assembly 80.

For certain types of aircraft, rocket 60 may be stowed in a prone position within the spaced enclosed by canopy 32 to the rear of seat 36. This storage arrangement is described in U.S. Pat. No. 3,433,440. A rocket erecting and positioning device as described in U.S. Pat. No. 3,433,440 is operative to position the rocket 60 for flight along one or more pre-selected paths. Alternatively, rocket 60 may be mounted within the cockpit space enclosed by canopy 32 to the rear of seat 36 in the manner shown and described in U.S. Pat. No. 3,355,127. It will be appreciated that rocket 60 may be mounted in any suitable location.

In the embodiment shown in FIG. 1, rocket 60 is shown to be mounted in its inclined launching position just behind seat back 38.

Figure 7:
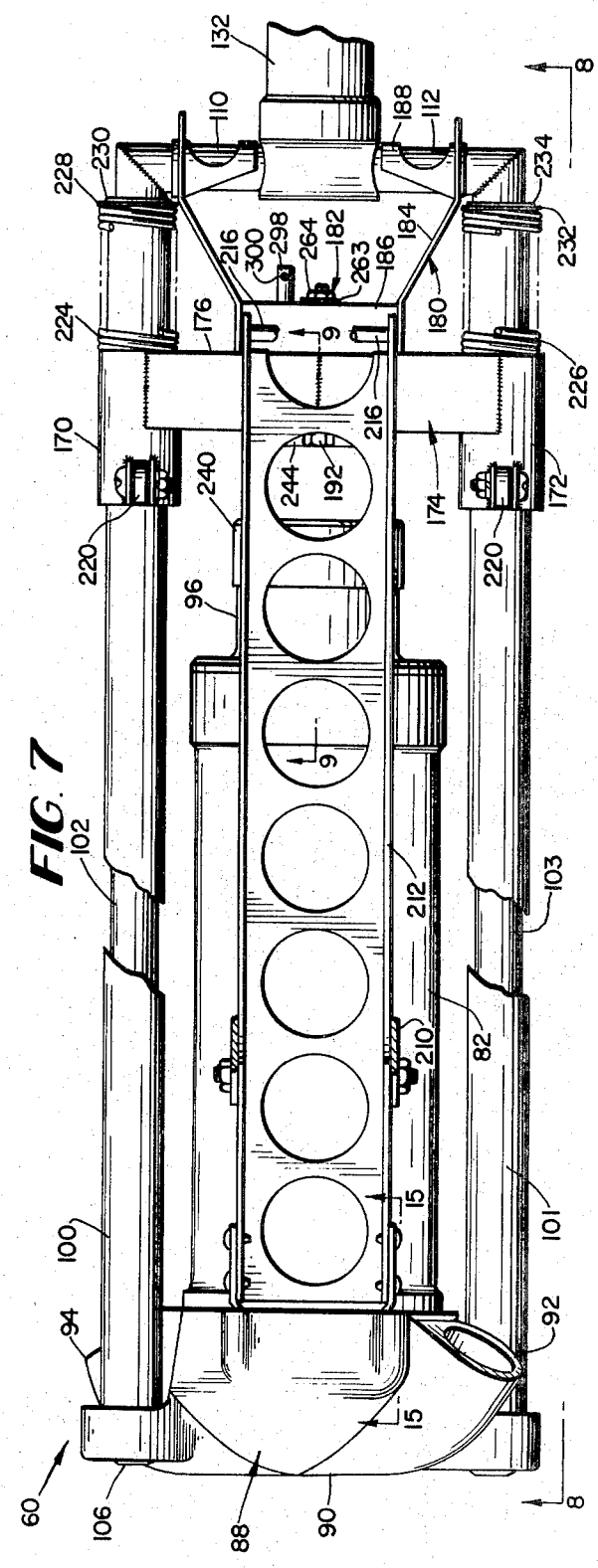
FIG. 7 is a section taken along lines 7—7 of FIG. 1 and showing assembly in elevation.

As shown in FIGS. 7–9 rocket 60 comprises a tractor type rocket motor having a tubular casing 82. Casing 82 defines a combustion chamber 84 for receiving a suitable gas-generating propellant indicated at 86. Mounted on casing 82 at the forward end of rocket 60 is a nozzle assembly 88 comprising a hollow nose cap housing 90 which mounts a pair of rearwardly and outwardly directed exhaust nozzles 92 and 94 (see FIG. 11). Nozzles 92 and 94 are on diametrically opposite sides of housing 90 and respectively define gas passages which communicate with chamber 84. The gas generated by burning the propellant stored in chamber 84 is exhausted through nozzles 92 and 94 to effectively pull rocket 60 through the air in tractor fashion. Preferably, nozzles 92 and 94 are so directed or skewed as to impart a stabilizing spin to rocket 60 during its ignited flight.

The construction of rocket thus far described is more fully described in the previously mentioned U.S. Pat. No. 3,355,127.

A tubular firing pin housing 96 is threaded on the rear end of casing 82 remote from the forward casing end that mounts nozzle assembly 88. Housing 96 is axially aligned with and extends rearwardly from casing 82.

As shown in FIGS. 7 and 8, launching assembly 62 comprises a pair of straight outer launching tubes 100 and 101 and a pair of inner launching tubes 102 and 103. Tubes 101 and 102 are disposed on diametrically opposite sides of casing 82. The longitudinal axes of tubes 100 and 101 and casing 82 are parallel as shown.

The forward ends of each of the outer tubes 100 and 101 is closed by a cap 106 (see FIG. 12). Each cap 106 is threaded on its outer tube. The forward capped ends of tubes 100 and 101 slidably and coaxially seat in separate sockets 108 as shown in FIG. 12.

Sockets 108 are formed in nozzle housing 90 along parallel axes. Sockets 108 open axially rearwardly and have cylindrically smooth interior side walls to slidably, removably receive the closed, capped ends of outer tubes 100 and 101. The rearward or aft ends of tubes 100 and 101 are open.

Inner tubes 102 and 103 are slidably and coaxially telescoped into tubes 100 and 101 respectively. The forward ends of tubes 102 and 103 received in tubes 100 and 101 are open and are adjacent to the capped ends of tubes 100 and 101. Groove seated O-rings 109 (one shown in FIG. 12) are carried by the forward ends of tubes 102 and 103 to provide a fluid-tight seal between each pair of inner and outer tubes.

The rearward ends of tubes 102 and 103 extend axially beyond the open rearward ends of tubes 100 and 101 and respectively terminate in cross portions 110 and 112 as shown in FIG. 10. Portions 110 and 112 extend perpendicular to the straight portions of tubes 102 and 103 that are telescoped into tubes 100 and 101. Portions 110 and 112 are aligned along an axis normally intersecting the longitudinal axis of the rocket. A connector tube 114 is coaxially received in the adjacent open ends of portions 110 and 112. Pins 116 (FIG. 10) fix tube 114 to portions 110 and 112. In this manner, the rearward ends of tubes 102 and 103 are fixed to each other.

As shown in FIG. 10, a firing chamber housing 120 is formed with a transverse through bore 122. The adjacent ends of portions 110 and 112 are coaxially received in bore 122. Groove seated O-rings 124 carried by housing 120 on the inner periphery of bore 122 provide fluid tight seals between housing 120 and tube portions 110 and 112.

Between O-rings 124, bore 122 is recessed at 126 to define a gas passage 128 extending peripherally around the ends of portions 110 and 112 within housing 120. Between the adjacent ends of tube portions 110 and 112, connector tube 114 is formed with at least one aperture 130 to establish fluid communication between passage 128 and the interiors of tubes 102 and 103.

Still referring to FIG. 10, housing 120 opens axially rearwardly. A housing 132, forming a part of launching assembly 62, is threaded into the rearwardly opening end of housing 120 and cooperates with housing 120 to define a firing chamber 134 that communicates with passage 128. The bottom of chamber 134 is closed by an end wall 136 that is integral with housing 132. A charge 138 of ignitable mix is contained in a cap and is seated on wall 136 within chamber 134. The longitudinal axes of housings 120 and 132 are aligned with the longitudinal axis of rocket 60.

As shown in FIG. 12, the rearward end of housing 132 extending axially beyond wall 136 terminates in a recess 139 that opens axially rearwardly. A firing pin housing 140 is coaxially threaded into recess 139. An O-ring 141 compressed between housing 140 and the internal wall of recess 139 provides a fluid tight seal between housings 132 and 140.

A firing pin 142 is coaxially and slidably received in a bore 144 that is formed through housing 140. At the inner end of bore 144, a primer 146 is mounted on the underside of wall 136. Firing pin 142 is releasably, axially retained in its inoperative or cocked position by a shearable pin 148. Pin 148 extends from a transverse bore in housing 140 and is received in an outwardly opening groove in firing pin 142. A groove seated O-ring 150 is carried by firing pin 142 to provide a fluid tight seal between pin 142 and the wall of bore 144. The outer end of bore 144 is connected by a hose or tube 152 to a housing containing an initiator or cartridge 160 (see FIG. 13). When cartridge 160 is fired, the resulting gases enter bore 144 to urge firing pin 142 toward primer 146 with sufficient force to shear pin 148. By striking primer 146 with firing pin 142, charge 138 is ignited, and the resulting expanding gases flow through chamber 134, passage 128 and aperture 130 and into tubes 102 and 103. The expanding gases flowing into tubes 102 and 103 pass out of the forward, open ends of tubes 102 and 103 and act against the closed capped ends of outer tubes 101 and 102 to forcibly launch the assembly of rocket 60 and tubes 100 and 101 upwardly along tubes 102 and 103.

A second firing pin 161 is advantageously mounted in housing 140 to fire a further primer 162. Firing pin 161 is releasably locked in its inoperative position by a shearable pin 164 in the same manner as firing pin 142 and is actuated simultaneously with pin 142 by gas pressure from cartridge 160 to assure ignition of charge 138. The bore receiving pin 161 is indicated at 166, and a hose or tube 168 connects bore 166 to the housing or cartridge 160.

It will be appreciated that any other suitable, conventional mechanism may be employed to ignite charge 138.

For some applications, the rocket may be launched by pulling it from its stowed position by any suitable means such as a small parachute (not shown) that may be deployed into the windstream.

Figure 17:
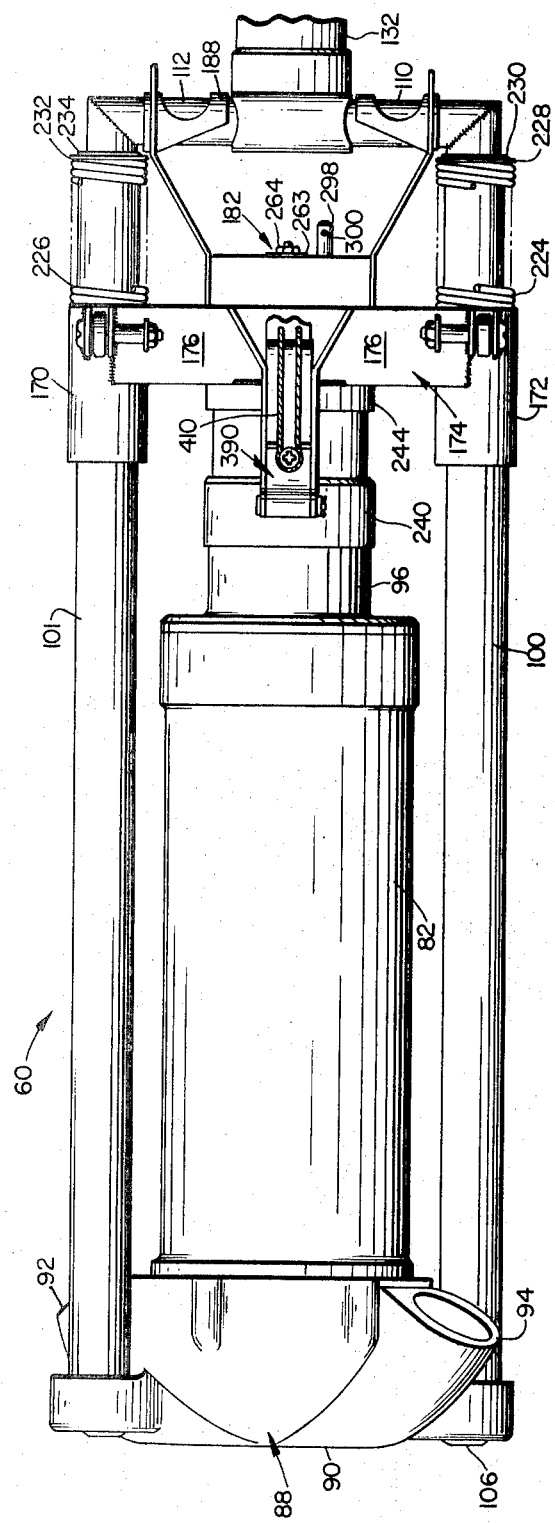
FIG. 17 is an elevation of the rocket and launching tube assembly shown in FIG. 7.
Figure 20:
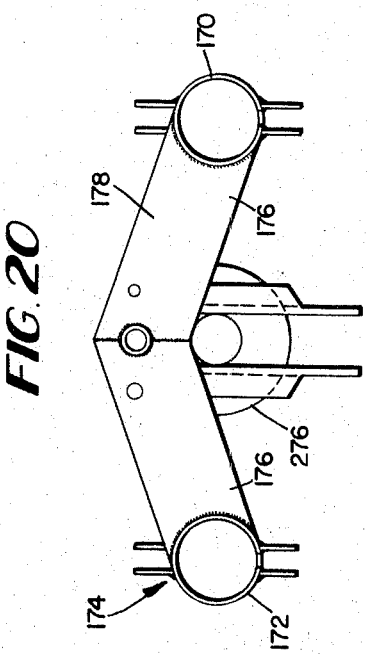
FIG. 20 is a bottom plan view of the cross head shown in FIG. 18.
Figure 19:
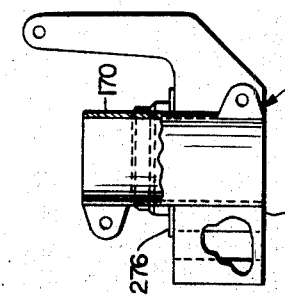
FIG. 19 is a side elevation of the cross head shown in FIG. 18.
Figure 18:
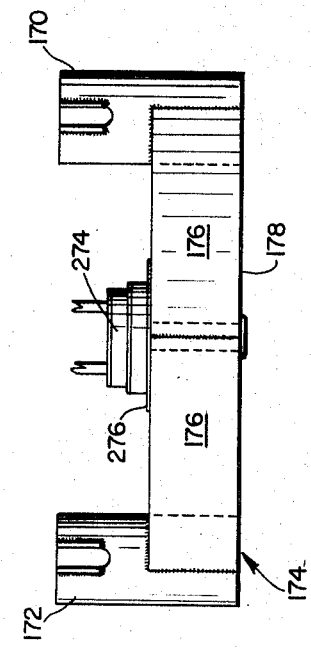
FIG. 18 is a front elevation of the cross head (part 174) shown in FIGS. 7, 8 and 17.

As shown in FIG. 17, outer tubes 100 and 101 slidably and coaxially extend through sleeves or collars 170 and 172 respectively. Collars 170 and 172 form a part of a rigid cross head 174 (see also FIGS. 18-20). Cross head 174 has a pair of structural members 176 that are rigidly joined together as by welding to form a cross piece 178. Cross piece 178 is rigidly fixed to collars 170 and 172 to thereby rigidly join the collars together. Cross piece 178 extends between collars 170 and 172 at the aft end of rocket 60. Collars 170 and 172 are axially spaced from the forward, capped ends of tubes 100 and 101 and are adjacent to the aft end of rocket 60 as shown.

As will be described in detail later on, cross head 174 is secured to the aft or rearward end of rocket 60, limits the rearward deployment of tubes 100 and 101, and retains tubes 100 and 101 with rocket 60 during the rocket flight.

Still referring to FIG. 17, a rigid retainer 180 is releasably fixed to cross piece 178 by a tie bolt and nut assembly 182. Retainer 180 is formed with a pair of transversely spaced apart arms 184 and a cross piece 186. Arms 184 are rigidly joined together at their upper ends by cross piece 186. In the inoperative positions of parts shown in FIG. 7, cross piece 186 seats against the underside of cross piece 178.

The lower ends of arms 184 terminate in axially aligned sleeve portions 188. Sleeve portions are disposed on opposite side of housing 120 and coaxially and rotatably receive tube portions 110 and 112 with a sliding fit. Thus, the lower end of retainer 180 is permanently connected to inner tubes 102 and 103, and the upper end of retainer 180 is releasably secured to cross head 174 by assembly 182.

As will be described in greater detail later on, assembly 182 comprises a specially constructed tie bolt 190 having an enlarged head 192. The strength of tie bolt 190 is such that it will fail in tension adjacent to head 192 under the force exerted by the expanding gases that are generated by igniting charge 138. When tie bolt 190 fails, the assembly of rocket 60 and cross head 174 will be released from retainer 180, allowing relative longitudinal travel between the assembly of rocket 60, cross head 174 and outer tubes 100 and 101, on the one hand, and the assembly of inner tubes 102 and 103 on the other hand.

Any suitable means may be employed for mounting rocket 60 and launcher assembly 62 in the aircraft. In this embodiment, a rigid support cradle 200 is fixed to the backside of seat back 38 and cradles tube portions 110 and 112 to support the assembly of tubes 102 and 103 and housings 120, 132 and 140 in place behind seat 36.

As shown in FIGS. 1 and 11, a horizontal cross bar 202 is fixed to and extends between the upper ends of a pair of upstanding, parallel, spaced rails 206 and 208. Rails 206 and 208 are on opposite sides of seat back 38. A structural stanchion-mounting bracket 210 is fixed to and extends forwardly from cross bar 202. A rocket-support stanchion 212 is suitably secured to the free end of bracket 210 (see FIGS. 1, 8 and 11). Stanchion 212 supports rocket 60 in its forwardly inclined launching position where the upper, nozzle end of rocket 60 is tipped forwardly at an acute angle form a vertical plane. The acute angle between the longitudinal axis or rocket 60 and a vertical plane is smaller than the angle between the rocket's longitudinal axis and a horizontal plane.

Referring to FIG. 15, a pair of parallel spaced apart support pins 213 (one shown) are fixed to the upper end of stanchion 212 and are slidably and removably received in rearwardly opening sockets 214 that are formed in nozzle housing 90. Seating engagement of pins 213 in the sockets in housing 90 supports the nozzle end of rocket 60 on stanchion 212. A pin 216 (FIGS. 7 and 8) secures the lower end of stanchion 212 to retainer 180, and a restraint link 218 (FIG. 8) mounted on pin 216 may be connected to a part of the aircraft or seat back 38 to provide added support.

With the foregoing construction, the launcher assembly of inner tubes 102 and 103, housings 120, 132 and 140 and retainer 180 remains with the aircraft upon launching rocket 60. Rocket 60 is mounted and supported in its launching position by pins 213, by the telescoping engagement of inner tubes 102 and 103 in outer tubes 100 and 101 respectively, and by tie bolt assembly 182 which releasably secures cross head 174 and retainer 180 together. Tie bolt assembly 182 releasably anchors rocket 60 in its launching position.

The launching travel of rocket 60 is guided by the sliding telescoping engagement of inner tubes 102 and 103 in outer tubes 100 and 101. Roller bearings 220 mounted on collars 170 and 172 ride on suitably tracks or guide rails that are indicated at 221.

As shown in FIG. 7, a pair of strong, coiled springs 224 and 226 peripherally surround the lower ends of outer tubes 100 and 101 respectively. As will be described in detail shortly, springs 224 and 226 deploy outer tubes 100 and 101 rearwardly to positions where they act as a tail boom when rocket 60 is launched.

Spring 224 is axially compressed between a washer 228 and the underside of cross head 174 in the region of collar 170. Washer 228 peripherally surrounds the lower end of tube 100 and seats against a retainer ring 230. Ring 230 is seated in a radially outwardly groove that is formed in the lower end of tube 100.

Spring 226 is similarly axially confined between a washer 232 and the underside of cross heat 174 in the region of collar 172. Washer 232 peripherally surrounds the lower end of tube 101 and seats against a retainer ring 234. Ring 234 is seated in a radially outwardly opening groove that is formed in the lower end of tube 101.

Referring again to FIG. 9, a locking collar 240 coaxially receives and is securely threaded on the lower end of housing 96. A bearing cup 242 extends coaxially through the lower open end of locking collar 240 and is securely threaded into an internally threaded retainer ring 244. Ring 244 is spaced axially rearwardly of locking collar 240 and peripherally surrounds the lower end of bearing cup 242. Collar 240, cup 242 and ring 244 are substantially coaxial with the longitudinal axis of rocket 60.

Still referring to FIG. 9, the end of bearing cup 242 received in locking collar 240 is formed with an annular, radially outwardly extending flange 246. Flange 246 seats on a flat, radially extending, annular shoulder 248 that is formed in the lower end of locking collar 240. A bearing retainer ring 250 is seated on the top face of flange 246. The lower end of housing 96 seats in a peripherally notched-out region of ring 250 when locking collar 240 is tightly threaded onto housing 96. Thus, ring 250 and flange 246 are tightly clamped axially between shoulder 248 and the lower end of housing 96 upon threading locking collar 240 onto housing 96. Cup 242 is therefore confined against axial displacement relative to locking collar 240, locking collar 240 is fixed to housing 96 which, in turn, is fixed to casing 82, and ring 244 is fixed to cup 242.

With continued reference to FIG. 9, ring 244 is formed with a through bore 252 that axially aligns, in assembled relation, with the axis of a sleeve 254. Sleeve 254 is coaxially received with a tight fit in a hole 256 that is formed through cross piece 178 along an axis that is parallel to, but spaced from the longitudinal axis of rocket 60. Tie bolt 190 coaxially and slidably extends through sleeve 254 and bore 252.

As shown in FIG. 9, ring 244 is formed with an enlarged recess 258 and an internal annular shoulder 260 at the upper end of bore 252. Tie bolt head 192 is nonrotatably received in recess 258 and seats on shoulder 260.

The lower end of tie bolt 190 extending beyond cross piece 178 extends slidably and coaxially through another sleeve 262. Sleeve 262 axially aligns with sleeve 154 and is received with a tight fit in apertures formed in the top and bottom walls of cross piece 186. The lower end of sleeve 262 extending beyond cross piece 186 terminates in a radially outwardly extending flange 263 that seats against the underside of cross piece 186.

The threaded end of tie bolt 190 extends axially beyond sleeve 262 as shown. A nut 264, forming a part of assembly 182, is threaded onto the rearward end of tie bolt 190 and seats against flange 263. Abutment of nut 264 with flange 263 and abutment of head 192 with shoulder 260 fix cross head 174 to retainer 180. Head 192 is partially seated under an external annular shoulder 265 on cup 242 so that it cannot be displaced upwardly.

By virtue of fixing cross head 174 to retainer 180 with tie bolt 190, springs 224 and 226 are held compressed between cross head 174 and their associated washers 228 and 232 and are incapable of extending or deploying outer tubes 100 and 101 axially rearwardly. Upon separation of tubes 100 and 101 from tubes 102 and 103, springs 224 and 226 will react against cross head 174 to urge outer tubes 100 and 101 rearwardly to reposition tubes 100 and 101 in such a manner that they act as a tail boom. This feature of the invention will be explained in more detail later on.

Still referring to FIG. 9, a ball bearing 270 is coaxially received in bearing cup 242. As will be described in greater detail later on, bearing 270 permits rocket 60 to spin without twisting pendant assembly 80. The outer race of housing 270 is seated against and is axially confined between ring 250 and an internal annular shoulder 272 that is formed in cup 242. The inner race of bearing 270 seats on the end face of the hub portion of a tubular, flanged member 274. Member 274 forms a part of cross head 174 and is rigidly fixed to cross piece 178 as by welding. The lower end of cup 242 seats on the radially outwardly extending flanged portion 276 of member 274.

An O-ring 278 is compressed between opposing peripheries of cup 242 and member 274 to establish a fluid tight seal between member 274 and cup 242. A groove seated O-ring 280, that is carried by locking collar 240, is compressed against cup 242 to provide a fluid tight seal between collar 240 and cup 242. Also, a groove seated O-ring 282 is carried by housing 96 and is compressed against locking collar 240 to provide a fluid tight seal between housing 96 and collar 240.

The hub portion of member 274 is internally threaded. An externally threaded thrust axle 284 is coaxially and securely threaded into the hub portion of member 274. Thrust axle 284 coaxially extends through and is journalled by bearing 270.

Still referring to FIG. 9, pendant assembly 80 comprises a tough, flexible rope 286 of suitable material. Rope 286 extends axially through thrust axle 284 and into housing 96. At its end in housing 96, rope 286 is received in and is fixed to a rigid, tubular trigger terminal 288. Trigger terminal 288 coaxially extends into thrust axle 284 and is non-rotatably secured to thrust axle by a woodruff key 290. Key 290 permits relative axial displacement between terminal 288 and the thrust axle 284.

Before the head of tie bolt 190 is snapped off by gas pressure in tubes 102 and 103, tie bolt assembly 182 fixes cross head 174 to ring 244 to prevent relative axial displacement between the assembly of member 274 and thrust axle 284, on the one hand, and the assembly of bearing cup 242 and ring 244 on the other hand. It will be recalled that cup 242 and ring 244 are threadedly secured together, and that member 274 and thrust axle 284 are threadedly secured together, thus fixing thrust axle 284 to cross head 174.

When the expanding gases resulting from ignition of charge 138 act on the closed ends of tubes 100 and 101 to snap off head 192, the assembly of cross head 174 and thrust axle 284 is released from the assembly of ring 244 and bearing cup 242 to permit the assembly of thrust axle 284 and member 274 to be axially displaced relative to bearing cup 242.

To assure that thrust axle 284 move axially rearwardly relative to cup 242 upon failure of tie bolt 190, a small-diametered pin 296 (see FIG. 16) extends slidably through a hole in the bottom wall of cross piece 178 and slidably through aligned apertures in the top and bottom walls of cross piece 186. The end of pin 296 extending beyond cross piece 186 slidably extends coaxially into a sleeve 298. A shearable pin 300 extends through aligned, transverse holes in the rearward ends of sleeve 298 and pin 296 to releasably secure pin 296 to sleeve 298. The longitudinal axis of pin 296 is aprallel to the axis of tie bolt 190.

Pin 296 has an enlarged head that seats against the forwardly facing side of the bottom wall of cross piece 178, and the forward end of sleeve 298 is seatable against the underside of cross piece 186. The axial dimensions of pin 296 and sleeve 298 are such that the axial length of pin 296 between its enlarged head and the forward end of sleeve 298 is slightly greater than the thickness of cross piece 186 and the bottom wall of cross piece 178 to provide a pin 296 with a slight axial play relative to cross pieces 178 and 186. Until tie bolt 190 fails under the force exerted by gas pressure acting on tubes 100 and 101, the force exerted by the gas pressure acting on tubes 100 and 101 will not be transmitted to pin 296.

Upon failure of tie bolt 190 and upon the resulting initial launching motion of the assembly of rocket 60 and cross head 174, pin 296 will be placed in tension by abutment of sleeve 298 with the underside of cross piece 186 and by abutment of the head of pin 296 with the bottom wall of cross piece 178. In this manner, the assembly of pin 296, sleeve 298 and pin 300, acting to prevent relative motion between cross head 174 and retainer 180, will momentarily restraint cross head 174 against movement with rocket 60.

By virtue of the threaded connection of thrust axle 284 to cross head member 274, thrust axle 284 will be restrained along with cross head 174, and the continued launching motion of rocket 60 will axially advance cup 242 and bearing 270 relative to thrust axle 284. Thrust axle 284 will therefore move axially rearwardly relative to bearing 270 and cup 242.

As shown in FIG. 9, thrust axle 284 is formed with a radially outwardly extending flange or lip 302 at its forward end within housing 96. In the inoperative positions of parts shown in FIG. 9 the axial spacing between flange 302 and bearing 270 is pre-selected for a purpose to be explained shortly. The relative axial motion produced between thrust axial 284 and bearing 270 as a result of the restraint applied by the assembly of pins 296 and 300 and sleeve 298 will be limited by abutment of flange 302 with the inner face of bearing 270.

Upon abutment of flange 302 with bearing 270 and upon continued launching motion of rocket 60, the resulting tension applied to pin 296 will cause pin 300 to shear or otherwise fail, thereby completely freeing cross head 174 and rocket 60 from retainer 180. Owing to the woodruff key connection between thrust axle 284 and terminal 288, terminal 288 will remain axially stationary relative to bearing 270 and cup 242, and thrust axle 284 will slide axially rearwardly relative to terminal 288 until flange 302 seats against bearing 270.

As shown in FIG. 9, thrust axle 284 is formed with a circumferentially extending, radially outwardly opening groove 304 in the region that is peripherally surrounded by bearing 270 when the component parts are in their illustrated, inoperative positions. Seated in groove 304 is a lock ring 306. Ring 306 is carried by thrust axle 284 and is confined against axial movement relative to thrust axle 284.

When thrust axle 284 is displaced axially rearwardly relative to bearing 270 to its position where flange 302 seats against bearing 270, lock ring 304 will be moved axially rearwardly of bearing 270 and will just axially clear bearing 270.

Figure 21:
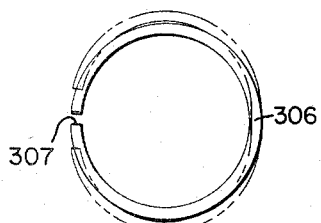
FIG. 21 is a plan view of the lock ring (part 306) shown in FIG. 9.

As shown in FIG. 21, lock ring 304 is radially split at 307 and is made from suitable spring metal so that when it is axially displaced rearwardly of bearing 270 at least a portion of it will spring outwardly into the space vacated by cross head member 274. It will be appreciated that upon rearward axial displacement of the assembly of cross head 174 and thrust axle 284 relative to bearing 270, member 274 will move axially rearwardly from bearing 270 to provide a space axially between member 274 and bearing 270 that is just axially long enough to receive lock ring 306 when it springs out. An annular shoulder 310, that is formed on the forward end of member 274 limits the outward spring of lock ring 306.

When the portion of lock ring 306 springs out into the space vacated by member 274 it will seat between member 274 and bearing 270 and will cooperate with flange 302 to confine the assembly of thrust axle 284 and cross head 174 against further axial motion relative to the assembly of bearing 270 and cup 242. In the inoperative positions of parts shown in FIG. 9, lock ring 306 is held in place in groove 304 by engagement with the inner race of bearing 270.

As shown in FIG. 9, the portion of terminal 288 extending forwardly and axially beyond thrust axle 284 is freely received in a rearwardly opening socket 312. Socket 312 is formed in housing 96 along the rocket axis and extends axially rearwardly from the wall of housing 96 that closes chamber 84.

Terminal 288 is releasably held in its illustrated, inoperative position by a cylindrical pin 314. The opposite ends of pin 314 are received in axially aligned, opposed sockets 316 and 318. Socket 316 is formed in the tubular wall of terminal 288, and socket 318 is formed in a load transfer key 320. Pin 314 is formed with a shearable, annular, radial flange 321. Terminal 288 is formed with an axially rearwardly directed shoulder 322 that seats against flange 321.

Figure 22:
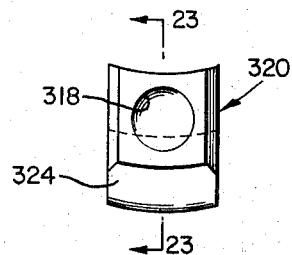
FIG. 22 is a plan view of the load transfer key (part 320) shown in FIG. 9.
Figure 23:
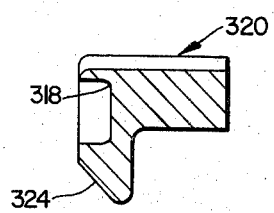
FIG. 23 is a section taken substantially along lines 23—23 of FIG. 22.

Key 320 has an ear or lip 324 (see FIGS. 9, 22 and 23) that seats against the forward end face of the inner race of bearing 270. Key 320 is thus supported on bearing 270, pin 314 is seated in socket 318 and thus supported on key 314, and terminal 288 is supported on pin 314 by seating engagement of shoulder 322 with flange 321.

Figure 24:
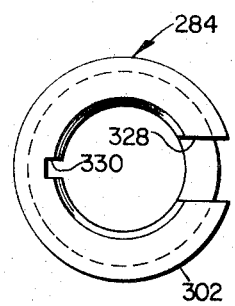
FIG. 24 is a plan view of the thrust axle (part 284) shown in FIG. 9.
Figure 25:
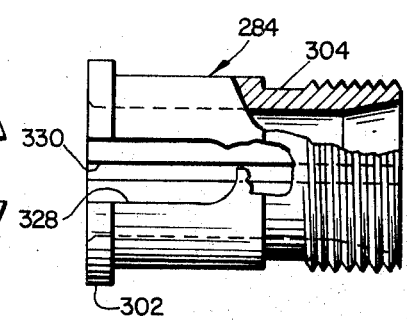
FIG. 25 is a partially sectioned elevation of the thrust axle shown in FIG. 24.

Referring to FIGS. 9, 24 and 25, key 320 is slidably and interfittingly received in a longitudinal slot 328 that is formed in thrust axle 284. Thrust axle 284 is of a tubular configuration. Slot 328 opens at the forward, flanged end of thrust axle 284, and the inner periphery of key 320 is cylindrically contoured to provide a smooth continuation of the cylindrical interior of thrust axle 284. Key 320 and thrust axle 284 are relatively axially displaceable. Diametrically opposite slot 328, thrust axle 284 is formed with a longitudinally extending keyway 330 (FIGS. 24 and 25) that receives key 290.

Figure 26:
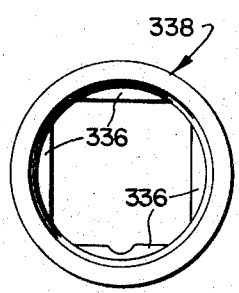
FIG. 26 is a plan view of the pin ring puller (part 338) shown in FIG. 9.
Figure 29:
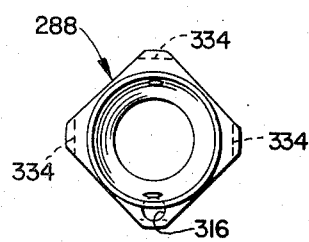
FIG. 29 is a plan view of the pendant terminal (part 288) shown in FIG. 9.

As shown in FIG. 9, terminal 288 is formed with radially outwardly opening grooves 334 (see also FIG. 29) in its region axially between socket 312 and shoulder 322. Grooves 334 interfittingly receive radially inwardly extending portions 336 of a firing pin puller ring 338 (see also FIG. 26). Ring 338 coaxially, peripherally surrounds terminal 288 and is nonrotatably and axially fixed thereto by engagement of portions 336 in groove 334.

A retainer ring 340 is seated in an annular, radially outwardly opening groove that is formed in ring 338. A washer 342 and an annular, radially inwardly extending flange 344 of a ball retainer ring 346 are axially confined between ring 338 and an opposing annular shoulder 348 on ring 338. Washer 342 and ring 346 coaxially, peripherally surround ring 338. Thus, ring 346 is mounted on ring 338 and is axially displaceably with ring 338, and ring 338 is mounted on terminal 288 and is axially displaceable with terminal 288. Terminal 288 and rings 338 and 346 are axially displaceable as a unit.

As will be described in detail shortly, a pair of firing pin mechanisms 350 and 352 are actuated to cause rocket ignition by axially, rearwardly displacing the assembly of terminal 288 and rings 338 and 346.

As shown in FIG. 9, firing pin mechanism 350 comprises a firing pin 354, a coiled spring 356 and a firing pin retainer ball 358. Firing pin 354 is coaxially and slidably mounted in an internal, cylindrically walled bore 360 that is formed in housing 96 along an axis that is parallel to and spaced from the longitudinal axis of rocket 60. Spring 356 peripherally surrounds the cylindrical shank of firing pin 356 and is axially confined in bore 360 between the enlarged head of pin 354 and an annular housing shoulder 362 at the rearward end of bore 360.

Figure 27:
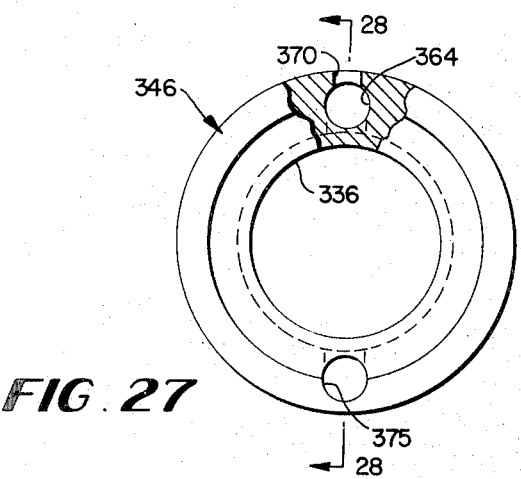
FIG. 27 is a plan view of the firing pin ball retainer ring (part 346) shown in FIG. 9.
Figure 28:
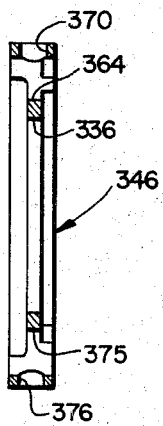
FIG. 28 is a section taken along lines 28—28 of FIG. 27.

The rearward shank end of firing pin 354 extends axially beyond bore 360 and is coaxially and slidably received in an aligning bore 364 (see FIGS. 9 and 27) formed through ring 346. The end of pin 354 in bore 364 is formed with a notch 366. Ball 358 is partially received in notch 366 and in a radial bore 370 that intersects bore 364. The axis of bore 370 extends radially of the longitudinal axis of ring 346.

Still referring to FIG. 9, ring 346 is slidably and coaxially received in housing 96. Housing 96 has a cylindrically smooth inner wall surface in the region of bore 370. Bore 370 is large enough to allow ball 358 to move radially outwardly. In the inoperative positions of parts shown in FIG. 9, ball 358 is held in notch 366 and bore 370 by engagement with the inner wall surface of housing 96. As long as ball 358 is held in notch 366, it prevents firing pin from moving axially forwardly toward a primer 371 that is carried by a metal well 372 at the forward end of bore 360.

The construction of firing mechanism 352 is the same as that just described for firing mechanism 350. Accordingly, like reference numerals suffixed by the letter "a" have been applied to designate the corresponding parts of firing mechanism 352. As shown in FIG. 9, firing pin 354a is slidable and coaxially received in a bore 373 that is formed in housing 96 along an axis that is parallel to and spaced from bore 360. Spring 356a is axially confined between the enlarged head of pin 354a and an annular housing shoulder 374 at the bottom of bore 360 similar to the construction described for mechanism 350. The rearward notched end of pin 354a is coaxially and slidably received in another bore 375 that is formed through ring 346 along an axis that is parallel to the axis of bore 364. Bores 375 and 364 are on diametrically opposite sides of ring 346 as shown. Ball 358a is partially received in notch 366a and in a further radial bore 376 that is formed in ring 346. Bore 376 intersects bore 375 and axially aligns with bore 370.

In the inoperative positions of parts shown in FIG. 9, engagement of ball 358a with the inner wall surface of housing 96 prevents ball 358a from being displaced radially outwardly to a position where it is removed or unseated from notch 366a. As long as ball 358a is seated in notch 366a, it prevents forward axial motion of pin 354a toward a second primer 377 that is mounted in a further metal well 378 at the forward end of bore 373.

Ignition of charges 379 in wells 372 and 378 causes ignition of a further charge 380 in chamber 84. Ignition of charge 380 ignites the rocket propellant 86. Charges 379 are ignited by striking primers 371 and 378.

It will be appreciated that firing mechanisms 350 and 352 may be of any suitable construction for effecting the ignition of the rocket propellant charge. While one firing mechanism is sufficient to achieve rocket ignition, two are employed as a redundancy to assure ignition in case one is inoperative.

When thrust axle 284 is displaced relatively axially rearwardly to the position where flange 302 seats against bearing 270, sufficient space is provided to allow the assembly of terminal 288 and rings 338 and 346 to be displaced axially rearwardly as a unit to a position where bores 370 and 376 axially align and register with bores 382 and 383 respectively. Bores 382 and 383 are axially aligned, extended radially of the axis of housing 96 and are formed through the portion of housing 96 that is received in lock ring 240.

When ring 346 is displaced axially rearwardly to a position where bores 370 and 376 align with bores 382 and 383 respectively, springs 356 and 356a will be compressed, and their bias will act through camming surfaces of notches 366 and 366a to urge balls 358 and 358a out of their notches and partially into bores 382 and 383 respectively. With balls 358 and 358a unseated from notches 366 and 366a, firing pins 354 and 354a are freed, and springs 356 and 356a will urge pins 354 and 354a forwardly, causing them to strike primers 371 and 377. As a result charges 379 will be ignited to cause ignition of charge 380, and ignition of charge 380 will result in ignition of the rocket propellant 86.

When thrust axle 284 is in its position where flange 302 seats against bearing 270, the axial distance between shoulder 322 and the top of flange 302 is equal the axial spacing between the centerline of each of the bores 370 and 383 and its associated bore 382, 383. Thus, by applying a sufficiently strong pull to rope 286, flange 321 will be sheared or otherwise fail allowing the assembly of terminal 288, rings 338 and 346, balls 358 and 358a and firing pins 354 and 354a to be pulled rearwardly to positions where bores 370 and 376 respectively align with bores 382 and 383.

When ring 346 is displaced axially rearwardly to its position where bores 370 and 376 align with bores 382 and 383, shoulder 322 will seat against flanges 302 to prevent further rearward displacement of ring 346. Upon alignment of bores 370 and 376 with bores 382 and 383, balls 358 and 358a will unseat from notches 366 and 366a to allow springs 356 and 356a to force firing pins 354 and 354a forward to strike primers 371 and 377, thereby igniting charges 379 in the manner previously described.

As shown in FIG. 9, rope 286 extends axially rearwardly through thrust axle 284. At its region just beyond thrust axle, rope 286 is flexed or trained around a sheave sector 390. The end of rope 286 remote from terminal 288 is anchored to a housing 392 (see FIGS. 5 and 6) that contains an unshown ballistic charge for severing the pendant connection between rocket 60 and the crewman. Secured to housing is a hook type clip 394. Flexible bridles 396 (one shown in FIG. 5), forming a part of pendant assembly 80, are secured by clip 294 to rope 286 to form an extension of rope 286. Bridles 396 may be made from any suitable, tough, flexible material and are secured to disconnect fittings on the man's torso harness 78 in the manner described in the previously identified U.S. Pat. No. 3,433,440. Pendant assembly 80 is stowed, unextended, in the aircraft in any suitable manner.

Figure 30:
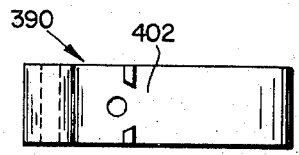
FIGS. 30 and 31 are respectively front and side elevations of the sheave section (part 390) shown in FIG. 9.
Figure 31:
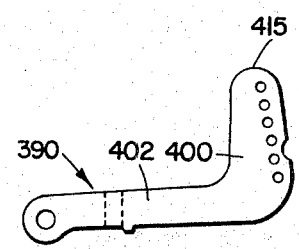

As shown in FIGS. 9, 30 and 31, sheave sector 390 is formed with a sheave segment 400 and an arm portion 402 extending generally perpendicularly from segment 400. The end of arm portion 402 remote from segment 400 is pivotally mounted on a pin 406 between a pair of mounting members 408. Pin 406 is secured to and extends between members 408. Members 408 form a part of cross head 174 and are rigidly fixed, as by welding, to cross piece 178.

A flexible cable in the form of a loop 410 may extend along the periphery of rope in the region of sector 390, thrust axle 284, and member 274 to keep rope 286 from rubbing against axle 284, member 274 and other internal parts on the rocket. Cable loop 410 is anchored by a pin 412 to terminal 288 and by a screw 414 to arm portion 402. Cable loop 410 is loose enough to permit pivotal motion of sheave sector 390 about the axis of pin 406.

As shown in FIG. 9, the axis about which sheave sector 390 is swingable or pivotable is laterally spaced from the common longitudinal axis of rocket 60 and terminal 288 and is contained in a plane that normally intersects the longitudinal axis of the rocket. Sheave sector 390 is one the side of rocket 60 that faces downwardly toward seat 36 and opposite from the side of the rocket adjacent to stanchion 212 in such a manner that a plane medially intersecting sector 390 and extending at right angles to the pivot axis of sector 390, extends radially of rocket 60, contains the longitudinal axis of rocket 60 and medially intersects stanchion 212. Since rocket 60 is inclined forwardly in its stowed position shown in FIG. 1, it will be launched upwardly and forwardly at an acute angle to the path of aircraft movement in a vertical plane. By virtue of positioning rocket 60 so that sheave 390 is on the downwardly facing side of the rocket, rope 286 will flex about the smoothly curved end (indicated at 415 in FIG. 9) of segment 400, and the more rocket 60 tips toward a position where its longitudinal axis is horizontal or parallel with the path of aircraft travel in a vertical plane the more rope 286 will flex about the end 415 of sector 390.

As shown in FIG. 9, the region of rope 286 that flexes about the end 415 of sector 390 is spaced along the longitudinal axis of the rope from the end of rope 286 that is coaxially received in and anchored to terminal 288. Since ring 346 is only capable of axial displacement in housing 96 it will be appreciated that the fire mechanism triggering force applied to the assembly of terminal 288 and rings 338 and 346 is required to be directed axially of rocket 60 to actuate firing mechanisms 350 and 352.

When rocket 60 is launched into the airstream created by the movement of the aircraft, however, rope 286 becomes windblown to assume a curved or catenary posture as shown in FIGS. 2–4. Under these conditions the tensioning force applied by rope 286 for actuating firing mechanisms 350 and 352 will no longer be entirely or substantially axially directed relative to rocket 60 and, instead, will have a significant force component extending at right angles to the longitudinal axis of the rocket. In the rockets described in the previously identified patents this condition prevented the actuation of the firing mechanism and the consequent ignition of the rocket propellant, and actuation of the firing mechanism did not occur until the nozzle end of the rocket tipped or pitched upwardly, in obedience to towline or pendant pull, to a position where the tension force applied by the towline was mainly axially directed relative to the rocket. With these prior rockets ignition of the rocket fuel therefore failed to occur until the rocket, in obedience to pendant or towline pull, had flipped up to a pitch angle of at least 90°. As a result, when the rocket finally ignited it would be in a poor attitude and consequently would be blown back at relatively high speeds to give rise to a hazardous condition.

With the present invention, however, the windblown curved or catenary posture of rope 286 causes rocket 60 to weather-cock into the airstream created by the movement of the aircraft (i.e., to pitch down toward a position where its longitudinal axis is parallel to the path of aircraft movement), and rope 286 will consequently flex about the end 415 of sheave sector 390 as shown in FIG. 9. By virtue of flexing rope 286 around the end of sector 390 in the manner shown, the radial component of the tensioning force applied by rope 286 and directed perpendicularly of the longitudinal axis of the rocket will be re-directed or translated by sheave sector 390 into a force component that is directed axially of rocket 60.

Because of sector 390, most of the force produced by tensioning rope 286 will axially be applied to terminal 288 at the end of rope 286 anchored in terminal 288. It therefore will be appreciated that sheave sector 390 acts as a force direction conversion mechanism to redirect or translate the force components that extend radially of the rocket axis so that the re-directed force acts axially of the rocket at the point of region of connection of rope 286 to terminal 288.

With this invention, therefore, firing mechanisms 350 and 352 will be actuated to ignite the rocket propellant 86 even though the rocket is weathercocked in the manner shown in FIGS. 3 and 4. Because of sheave sector 390, firing mechanisms 350 and 352 will be actuated to ignite the rocket propellant independently of any weathercocking of the rocket into the airstream that is created by the motion of the aircraft, independently of the posture that rope 286 assumes due to the windblast, and regardless of the magnitude of the acute angle between the longitudinal axis of rocket 60 and the path of aircraft movement in a plane passing through the aircraft and containing the longitudinal axes of rocket 60 and rope 286.

When pendant assembly 80 is extended to its tensioned condition to pull terminal 288 axially rearwardly and to thereby cause actuation of firing mechanisms 350 and 352, shoulder 322 will seat on flange 302 and flange 302 will be seated on the inner race of bearing 270 as previously described. Thus, the thrust of the ignited rocket will be transmitted through bearing 270, flange 302, terminal 288 and pendant assembly 80 to pull the crewman from the aircraft through the motion-transmitting connection provided by the extended and tensioned pendant assembly 80.

Because of the relative cant of rock nozzles 92 and 94, rocket 60, upon ignition, will spin or rotate about its longitudinal axis. Because of bearing 270, rocket 60 will spin or rotate relative to thrust axle 286. Since thrust axle 286 is not rotating with rocket 60, pendant assembly 80 will not be turned or twisted by the spinning rocket.

To operate the rocket escape apparatus of this invention, the crewman pulls a conventional D-ring 630 (see FIG. 13) which is operatively connected by any suitable means, such as a motion-transmitting cable assembly 632, to a standard canopy jettison release mechanism 634, to a shaped charge canopy cutter initiator 636, to an inertia reel lock control mechanism 638, and to a mechanism 639 for firing the initiator or cartridge 160.

When handle 630 is pulled, mechanism 634 is actuated to jettison canopy 32 in the usual manner (see FIG. 2). After a delay of about 0.3 second initiator 636 is detonated by the D-ring pull to detonate unshown, shaped charges for cutting canopy 32 loose in the event that mechanism 634 fails to jettison the canopy. Control 638, if utilized, controls the tension in the crewman's shoulder straps in the usual manner. Reference is made to U.S. Pat. No. 3,433,440.

Upon jettisoning canopy 32, initiator or cartridge 160 is then detonated or fired after a short time delay that permits canopy to travel out of the rocket launching path. The resulting expanding gases pass through tubes 152 and 168 to cause firing pins 142 and 161 to strike their primers, thereby causing ignition of charge 138. The expanding gases resulting from ignition flow upwardly in tubes 102 and 103 to act on the forward, closed ends of outer tubes 100 and 101 to cause tie bolt 190 to fail.

The gas pressure on the closed ends of tubes 100 and 101 will now initiate the launching of rocket 60, causing the assembly of rocket 60, tubes 100 and 101 and cross head 174 to move upwardly and forwardly along the forwardly inclined rocket launching path. Upon the initial relative motion between cross head 174 and retainer 180, pin 296 applies a momentary restraining force to the assembly of cross head 174 and thrust axle 284. The resulting relative axial motion between thrust axle 284 and bearing 270 causes flange 302 to seat against bearing 270.

Upon seating flange 302 against bearing 270, pin 300 will fail under the force exerted by the gas pressure acting on the closed ends of tubes 100 and 101. Alternately, pin 296 may be designed to fail. In either event, the assembly of rocket 60, tubes 100 and 101 and cross head 174 will now be completely released for airborne flight, with nozzle 90 sliding off pins 213.

The pressure of gas acting on the closed ends of tubes 100 and 101 therefore launch the assembly of rocket 60, tubes 100 and 101 and cross head 174 upward and forwardly (as viewed from FIG. 2) through the hatch opening and along the rocket launching path, thereby causing tubes 100 and 101 to move axially along tubes 102 and 103 which remain with the aircraft. Until tubes 100 and 101 separate from tubes 102 and 103, the trapped gases in tubes 100 and 101 prevent springs 224 and 226 from deploying tubes 100 and 101 rearwardly.

At this stage of rocket travel, and until rope 286 is extended and tensioned, rocket 60 is unignited.

When rocket 60 has travelled to a position where it is almost beyond cockpit 34, outer tubes 100 and 101 will separate from inner tubes 102 and 103, thereby releasing the gases in tubes 100 and 101. Since cross head 174 is now separated from retainer 180, springs 224 and 226 will immediately react against cross head 174 to urge tubes 100 and 101 axially rearwardly until caps 106 on the forward ends of tubes 100 and 101 seat against the opposed face of cross head 174 in the regions of collars 170 and 172.

Abutment of caps 106 with cross head 174 prevents further rearward deployment of tubes 100 and 101 under the bias of springs 224 and 226. When caps 106 seat against cross head 174, tubes 100 and 101 will be in their rearwardly deployed position where they extend axially beyond the rearward end of rocket 60 (see FIGS. 2-4) and act as a tail boom.

Before rocket 60 is launched the center of gravity of the rocket disposed axially forwardly of the point or region where the pull of tensioning force of pendant assembly 80 is applied to the rocket. By deploying tubes 100 and 101 axially rearwardly to their tail boom-acting positions, the center of gravity of the launched rocket assembly is moved during the unignited rocket flight axially rearwardly toward the point or region of connection of pendant assembly 80 to the aft end of the rocket. In addition, the center of pressure of the rocket will be displaced axially rearwardly during the unignited rocket flight due to the surface area provided by tubes 100 and 101 in their rearwardly deployed positions. As a result of displacing the rocket's center of gravity closer to the point of connection of pendant assembly 80 to the rocket, the pitching moment of inertia of the rocket will be increased during the unignited rocket flight. Therefore, the rate at which rocket will pitch upwardly from its weathercocked position shown in FIGS. 3 and 4 will be appreciably slowed.

As soon as rope 286 is extended into the airstream created by the movement of the aircraft it becomes windblown to assume a curved, or more particularly, a catenary posture shown in FIG. 2. Thus, the rope 286 will be blown by the wind blast to bow rearwardly.

The windblown catenary or curved posture of rope 286 exerts an appreciably pitching moment on the travelling rocket, causing the nozzle end of rocket 60 to tip down toward the horizontal as shown in FIG. 3. As a result, rocket 60 will weathercock.

At the stage shown in FIG. 4, rocket 60 is still weathercocked, and rope 286 is still windblown in its catenary or curved posture, but now, rope 286 has been extended to a tensioned condition where it applies the pull or triggering force to actuate firing mechanisms 350 and 352.

The component of pendant or towline pull acting transversely of the rocket because of the windblown catenary or curved posture of rope 286 will be redirected by sheave sector 390 to act axially of the rocket at the region where rope 286 is secured to terminal 288. Thus, a sufficient axial pull is applied by the tensioned pendant assembly 80 to pull ring 346 axially rearwardly to a position where balls 358 and 358a unseat from their associated firing pin notches 366 and 366a. Firing mechanisms 350 and 352 will therefore be actuated in the manner previously described to ignite charges 379. Ignitiion of charges 379 ignites charge 380 which, in turn, ignites the rocket propellant 86. Rocket 60 will therefore be ignited even though it is weathercocked as shown in FIG. 4. As shown in FIG. 3, rocket 60 has pitched down to a position where it is closely parallel to the flight of the aircraft. Rocket 60 is thus headed into the airstream at the time that ignition occurs at FIG. 4.

Upon igniting the rocket propellant, rocket 60, which is still weathercocked, will drive into the windstream or airstream created by the movement of the aircraft to continue its airborne flight. Rocket 60 will now pitch upwardly to the position shown in FIG. 5 where the weight of the crewman balances aerodynamic drag on the rocket, but the pitch rate will be slowed appreciably because of the increased pitching moment of inertia of rocket 60. Under the balanced condition shown in FIG. 5, rope 286 will be substantially straightened, and rocket 60 will be travelling along an upwardly inclined path that makes an obtuse angle with the longitudinal axis of rope 286.

The thrust of the rocket is applied through the motion-transmitting connection provided by the extended and tensioned pendant assembly 80 to pull the crewman through the open hatch and away from the aircraft.

If seat 36 is of the type described in the previously identified U.S. Pat. No. 3,355,127, seat back 38 will be pulled upwardly by the rocket thrust that is applied to the seat through the man's restraint strap just before they are released to release the man from the seat (see FIG. 5). When seat back 38 is pulled upwardly, seat pan 40 will pivot down to form a chute which guides the man out of the cockpit with a straightened posture.

After the crewman has been pulled a safe distance from the aircraft by the ignited rocket flight, the charge in housing 392 is exploded to sever pendant assembly 80 (see FIG. 6), thereby freeing the man from rocket 60. At this stage, rocket 60 has sufficient propellant remaining to fly a safe distance away from the man where it does not interfere with the opening of the man's parachute. The charge in housing 392 may be detonated by any suitable means such as that described in the previously identified U.S. Pat. Nos. 3,433,440, 3,355,127 and 3,424,409.

From the foregoing description it will be appreciated that this invention provides an improved rocket trajectory as compared with that in the previously identified patents. It also will be appreciated that this invention is advantageous for effecting escapes from aircraft or other vehicles travelling at relatively low speeds as well as high speeds.

It will be noted that the improved apparatus of this invention will also provide for ignition of the rocket propellant when the posture of rope 286 is relatively straight to apply a substantially axially directed force to terminal 288. Under such conditions, rope 286 will not flex around sheave section 290, and the tension of the extended rope 286 will apply a substantially axial pull to ring 346 to cause actuation of firing mechanisms 350 and 352 and consequent ignition of the rocket propellant.

The rocket escape apparatus of this invention may be employed to remove any kind of a load from any kind of vehicle or a space. The term "load" as employed in the specification and claims herein is intended to cover a person and any inanimate object. The term "vehicle"

as employed herein covers any kind of carrier such as an ejection seat.

What is claimed and desired to be secured by Letters Patent is:

1. In an apparatus for applying a pulling force to a person or other load, a rocket, an extendible, flexible towline connected to said rocket and providing a motion-transmitting connection between said rocket and said load, means for imparting airborne flight to said rocket in an unignited condition to extend and tension said towline, said towline, upon being extended to a tensioned condition by the unignited airborne flight of said rocket, exerting a pulling force which has a transverse component when the towline assumes a windblown posture and said rocket is at least partially weathercocked into an airstream, said transverse component being directed transversely of the longitudinal axis of said rocket, force direction converting means carried by said rocket for redirecting said transverse force component while the rocket is still at least partially weathercocked into said airstream, and means responsive to the redirected force component and any pull which the tensioned towline exerts axially of the rocket for igniting the fuel of said rocket to cause the rocket to apply a pulling force to said load through the connection provided by the extended towline.

2. The apparatus defined in claim 1 wherein said force direction converting means comprising a part pivotally mounted on said rocket for engaging a region of said towline to flex said towline when said towline assumes a windblown posture during the flight of said rocket.

3. In an apparatus for pulling a person or other load from a space, a rocket, an extendible towline providing a motion transmitting connection between said rocket and said load, means for imparting airborne flight to said rocket to extend said towline and to pull said load from said space through the motion-transmitting connection provided by the extended towline, and means for increasing the pitching moment of inertia of said rocket per se upon imparting the airborne flight to said rocket.

4. In an apparatus for pulling a person or other load from a space, a rocket, an extendible towline providing a motion transmitting connection between said rocket and said load, means for imparting airborne flight to said rocket in an unignited condition to extend and tension said towline, means responsive to the tensioning of said towline for igniting the fuel in said rocket to continue said flight and pull said load from said space through the motion-transmitting connection provided by said towline, and means rendered effective upon imparting the airborne flight to said rocket for increasing the pitching moment of inertia of said rocket per se.

5. In an apparatus for pulling a person or other load from a space, a rocket, an extendible towline connected to said rocket and providing a motion transmitting connection between said rocket and said load, means for imparting airborne flight to said rocket to extend said towline to cause said rocket to pull said load from said space through the motion transmitting connection provided by the extended towline, said rocket having a center of gravity that is axially spaced from the point where said towline is connected to said rocket, and means rendered effective upon imparting the airborne flight to said rocket for shifting the center of gravity of said rocket per se toward said point of towline connection to said rocket.

6. In an apparatus for pulling a person or other load from a space, a rocket, an extendible towline providing a motion-transmitting between said rocket and said load, means for launching said rocket in an unignited condition for airborne flight to extend and tension said towline, said launching means comprising (a) a pair of first tubes carried by said rocket, (b) a pair of second tubes telescopically and axially slidably extending into said first tubes, each of said first tubes being closed at one end, and (c) means for selectively introducing gas under pressure through said second tubes to act on the closed ends of said first tubes for causing axial separation of said first tubes from said second tubes, the force exerted by said gas on the closed ends of said first tubes being transmitted by said first tubes to said rocket to launch said rocket, means responsive to the tensioning of said towline to ignite the fuel in said rocket to cause said rocket to continue said flight and to pull said load from said space through the motion-transmitting connection provided by the extended towline, and means for displacing at least one of said first tubes to a position where it acts as a tail boom during said flight.

7. The apparatus defined in claim 6 wherein said first tube displacing means includes parts acting on both of said first tubes to displace both of said first tubes axially rearwardly relative to said rocket to positions where both of said first tubes act as the tail boom.

8. A method of pulling a load from a space with an apparatus having a rocket connected by an extendible motion-transmitting towline to said load and a deployable part carried by the rocket, said method comprising the steps of imparting airborne flight to said rocket to extend said towline and to cause the rocket to pull said load from said space through the connection provided by the extended towline, and deploying said part to a position where it acts as a tail boom upon imparting the airborne flight to said rocket.

9. A method of pulling a person or other load from a moving vehicle with an apparatus having a rocket connected by an extendible motion-transmitting towline to said load, said method comprising the steps of launching said rocket for airborne flight in an unignited condition into the airstream created by the movement of the vehicle to extend and tension said towline and allowing the rocket to weathercock into said airstream when the extended towline assumes a predetermined posture under the influence of said airstream and exerts a force component which extends transversely of the rocket's longitudinal axis, redirecting said transversely extending force component while the rocket is at least partially weathercocked into the airstream, and applying the redirected force component along with any pull which the extended towline exerts axially of the rocket to effect ignition of the fuel in said rocket.

10. In an apparatus for pulling a person or other load from a moving vehicle, a rocket having an ignitable fuel, a firing mechanism carried by said rocket and actuatable by a force applied axially of said rocket to effect ignition of said fuel, an extendible flexible towline connected to said firing mechanism and providing a motion transmitting connection between said rocket and said load, means for imparting airborne flight to said rocket into the airstream created by the movement of said vehicle to extend and tension said towline, said towline being effective to apply a pulling force to said mechanism upon being tensioned by the airborne flight of said rocket, said pulling force having a force component that is directed transversely of the rocket when said rocket is weathercocked into the airstream by a windblown posture of said towline, and a device carried by said rocket and coacting with said towline for transforming said transversely directed force component into a component that is directed axially of said rocket for effecting the fuel-igniting actuation of said firing mechanism, the ignition of said fuel causing said rocket to continue its flight and to pull said load from said vehicle through the motion-transmitting connection provided by the extended towline.

11. The apparatus defined in claim 10 wherein said rocket has a predetermined pitching moment of inertia before flight is imparted to it, said apparatus further comprising means rendered effective upon imparting the airborne flight to said rocket for increasing said pitching moment.

12. The apparatus defined in claim 11 wherein the rocket's center of gravity and the point at which said towline is connected to said rocket are axially spaced apart, said apparatus further comprising means rendered effective upon imparting the airborne flight to said rocket for moving said rocket's center of gravity closer to said point.

13. In an apparatus for pulling a person or other load from a space, a rocket, an extendible towline providing a motion transmitting connection between said rocket and said load, means for imparting airborne flight to said rocket to extend said towline and to pull said load from said space through the motion-transmitting connection provided by the extended towline, and means for increasing the pitching moment of inertia of said rocket upon imparting the airborne flight to said rocket, said means for increasing said pitching moment of inertia comprising a part carried by said rocket and means for displacing said part to a position where it acts as a tail boom during the flight of said rocket.

14. In an apparatus for pulling a person or other load from a space, a rocket, an extendible towline providing a motion transmitting connection between said rocket and said load, means for imparting airborne flight to said rocket in an unignited condition to extend and tension said towline, means responsive to the tensioning of said towline for igniting the fuel in said rocket to continue said flight and pull said load from said space through the motion-transmitting connection provided by said towline, and means rendered effective upon imparting the airborne flight to said rocket for increasing the pitching moment of inertia of said rocket, said means for increasing said pitching moment of inertia comprising at least one part carried by said rocket and means displacing said part to a position where it acts as a tail boom during the unignited and ignited airborne flight of said rocket.

15. In an apparatus for pulling a person or other load from a moving vehicle, a rocket having an ignitable fuel, an extendible, flexible towline connected to said rocket and providing a motion-transmitting connection between said rocket and said load, means for imparting airborne flight to said rocket in an unignited condition into the airstream created by the moving vehicle to extend and tension said towline, triggering means carried by the rocket and responsive to a pull exerted by the tensioned towline in a predetermined direction to effect ignition of the rocket fuel, and force direction converting means carried by said rocket and effective when the towline pull does not by itself act in said predetermined direction for redirecting the towline pull to act in said predetermined direction to cause said triggering means to ignite the rocket fuel regardless of the altitude which the rocket assumes when the extended towline assumes a windblown posture before the rocket fuel is ignited.

16. The apparatus defined in claim 15 wherein said predetermined direction extends axially of said rocket.

17. The apparatus defined in claim 15 wherein said towline is secured at one end to a part of said triggering means and wherein said force direction converting means comprises a part about which a portion of said towline is flexed when said towline pull does not act in said predetermined direction, said portion of towline being between said one end of said towline and the other end of said towline.

18. The apparatus defined in claim 15 wherein said towline is secured at one end to a part of said triggering means, and wherein said force direction converting means comprises a part about which a portion of said towline is flexed to effect the redirection of said towline pull.

19. The apparatus defined in claim 18 comprising means pivotally mounting said part of said force direction converting means on said rocket.

20. The apparatus defined in claim 15 wherein the force direction converting means comprising a pivotally mounted part which is positioned to engage a portion of said towline to redirect the towline pull to said predetermined direction, and wherein said predetermined direction extends axially of said rocket.

21. The apparatus defined in claim 15 wherein said predetermined direction extends axially of said rocket, and wherein said triggering means comprises a firing mechanism and a terminal which is connected to a part of said mechanism and which is mounted for axial displacement in response to a pull in said predetermined direction, the end of said towline being anchored to said terminal.

22. The apparatus defined in claim 15 wherein the center of gravity of said rocket is located axially forwardly of the point where the force of the flight of said rocket is applied to said towline, said apparatus further comprising means for shifting said center of gravity rearwardly upon imparting the airborne flight to said rocket to locate the center of gravity of the rocket per se closer to said point during the rocket's airborne flight.

23. The apparatus defined in claim 15 comprising means for increasing the pitching moment of inertia of said rocket per se upon imparting the airborne flight to said rocket.

24. The apparatus defined in claim 23 wherein said means for increasing said pitching moment of inertia comprises at least one part and means for moving said part to a position where it acts as a tail boom during said flight.

* * * * *

UNITED STATES PATENT OFFICE
CERTIFICATE OF CORRECTION

Patent No. 3,847,329      Dated November 12, 1974

Inventor(s) Robert M. Stanley

It is certified that error appears in the above-identified patent and that said Letters Patent are hereby corrected as shown below:

Column 7, line 63, change "heat" to --head--.

Column 8, line 43, change "154" to --254--.

Column 13, line 56, change "flanges" to --flange--.

Column 22, line 33, change "comprising" to --comprises--.

Signed and sealed this 21st day of January 1975.

(SEAL)
Attest:

McCOY M. GIBSON JR.
Attesting Officer

C. MARSHALL DANN
Commissioner of Patents